United States Patent [19]

Palm et al.

[11] 4,391,790

[45] Jul. 5, 1983

[54] METHOD AND APPARATUS FOR REDUCING THE AMMONIA CONCENTRATION OF SULFUR RECOVERY FACILITY GAS STREAMS

[75] Inventors: John W. Palm; Robert L. Reed, both of Tulsa, Okla.

[73] Assignee: Standard Oil Company (Indiana), Chicago, Ill.

[21] Appl. No.: 306,061

[22] Filed: Sep. 28, 1981

[51] Int. Cl.³ .............................................. C01B 17/02
[52] U.S. Cl. ................................ 423/574 R; 423/237; 423/573 R; 423/576; 252/411 S; 422/178; 422/212
[58] Field of Search ............... 423/573, 574, 576, 237; 252/411 R, 411 S; 422/178, 212

[56] References Cited

U.S. PATENT DOCUMENTS

| | | | |
|---|---|---|---|
| 3,702,884 | 11/1972 | Hunt et al. ...................... | 423/574 X |
| 3,970,743 | 7/1976 | Beavon ................................. | 423/574 |
| 4,035,474 | 7/1977 | Kunkel et al. .................. | 423/574 R |
| 4,075,310 | 2/1978 | Fischer ................................ | 423/574 |
| 4,255,408 | 3/1981 | Sims ..................................... | 423/574 |

FOREIGN PATENT DOCUMENTS 1004030  1/1977  Canada .

*Primary Examiner*—Gregory A. Heller

[57] ABSTRACT

Ammonium compounds deposited on catalyst in a sulfur recovery facility are removed by passing a hot regeneration stream in contact with the catalyst to produce a regeneration effluent stream containing ammonia followed by combustion or catalysis to reduce the concentration of ammonia in the regeneration effluent stream.

14 Claims, 2 Drawing Figures

METHOD AND APPARATUS FOR REDUCING THE AMMONIA CONCENTRATION OF SULFUR RECOVERY FACILITY GAS STREAMS

INTRODUCTION

The present invention relates to process and apparatus for the recovery of elemental sulfur from feed streams containing ammonia and/or other nitrogen compounds. In a particular aspect, the invention relates to process and apparatus for minimizing the amount of ammonia present in a tail gas clean-up unit and thus prevent plugging of the equipment with ammonium compounds.

BACKGROUND OF THE INVENTION

Many crude oils processed by refineries contain varying amounts of nitrogen and sulfur compounds. During the refining process, it frequently becomes necessary to remove such compounds because they impart undesired properties such as disagreeable odor, corrosivity, poor color, and the like, to saleable products. In addition, the compounds may have deleterious effects in various catalytic refining processes applied to oils.

Various processes have been devised for removing the nitrogen and sulfur compounds from oils, one common process being treatment with hydrogen wherein the nitrogen and sulfur compounds are converted to ammonia ($NH_3$) and hydrogen sulfide ($H_2S$). Such conversion is usually promoted by use of elevated temperatures and pressures in the presence of hydrogenation catalysts. Reactions of the nitrogen and sulfur compounds with hydrogen to form $NH_3$ and $H_2S$ can also occur in other processes such as thermal and catalytic cracking, reforming, and hydrocracking, which are not specifically designed for such purpose. There are thus produced various effluent gas streams containing $NH_3$ and $H_2S$.

The removal of some $NH_3$ and $H_2S$ from such effluent streams may be accomplished by scrubbing with water, preferably at elevated pressure and low temperature. To obtain the desired extent of removal, however, it is often necessary to use a rather large amount of water so that a dilute aqueous solution of ammonia and $H_2S$ is formed. With increasing urbanization and concentration of industrial complexes, the situation is rapidly developing where pollution of water near population centers with such compounds is not desirable. The refiner thus may be compelled to remove the $NH_3$ and $H_2S$ from such waters in, for example, a sour water stripper resulting in a need to then dispose of the resulting $NH_3$ and $H_2S$ vapor.

In many cases, it is desirable to use the hydrogen sulfide present in such mixtures as feed to a sulfur recovery operation; however, the presence of ammonia can give rise to complications such as, for example, the formation of ammonium sulfite and ammonium sulfate in a sulfur recovery system where cooling occurs, resulting in fouling of the catalyst and plugging of the equipment. While processes exist which are capable of effecting separation of ammonia from hydrogen sulfide, such methods require a large capital investment and the operating costs are relatively high.

In conventional sulfur recovery operations in which the feed gas typically contains more than 50 mole percent hydrogen sulfide, all of the acid gas feed is introduced into a noncatalytic combustion zone or furnace together with enough oxygen ordinarily in the form of air to convert about one-third of the hydrogen sulfide into sulfur dioxide. In the case of ammonia-contaminated hydrogen sulfide streams, even when sufficient additional air to burn ammonia is added, the hydrogen sulfide present competes with the ammonia for the extra oxygen, resulting oftentimes in incomplete combustion of the ammonia. The presence of excessive concentrations of ammonia in the combustion products creates conditions downstream for the formation of ammonium salts, such as, for example, those mentioned above, in the condenser tubes, the tail gas scrubber system, separator seal legs, etc. The failure of oxygen to effect complete combustion was borne out in tests performed where ammonia was purposely added to the feed. In a plant test, ammonia was present in the feed to the extent of about 23 volume percent or 230,000 ppm (dry basis). A conversion of about 99.9% was achieved in the furnace and the effluent had an ammonia concentration of about 200 ppm. In a second case (a laboratory run in which the feed contained 15 volume percent (dry basis) $NH_3$), the ammonia conversion exceeded 99.9% and the furnace effluent had an ammonia concentration of about 35 ppm.

We have found in the past that one preferred method for handling a gas stream which contains ammonia in a conventional sulfur plant is to feed all of the ammonia-containing gas to the burner of the furnace together with a portion of ammonia-free acid gas, while the remaining ammonia-free acid gas is fed to a downstream point. This makes it possible to achieve ammonia conversions in a plant furnace as high as indicated above for the laboratory test. In plant units with this design which do not have a tail gas clean-up unit, the resulting ammonia at low concentration has passed through the condensers and catalyst beds without causing problems. However, as discussed below, even this low concentration of ammonia can cause problems in tail gas clean-up units.

Moreover, sulfur plants are employed to process $H_2S$-containing gases from various types of industrial operations other than petroleum refining. Hydrogen sulfide from certain operations may contain nitrogen-containing compounds which can form ammonia in the sulfur plant noncatalytic combustion zone or thermal reactor. An example is the hydrogen sulfide which is recovered from coal gas, also known as coke-oven gas, which is formed from destructive distillation of bituminous coal. This gas often contains hydrogen cyanide (HCN) which is partially combusted in the thermal reactor but may be partially hydrolyzed therein to form gaseous ammonia. We have found that the combustion system can be designed to result in a high efficiency for combustion of HCN, with the ammonia concentration in the effluent being low enough that it does not cause a problem in the condensers and catalytic reactors of a conventional sulfur plant; however, as discussed below, it may cause a problem in certain tail gas clean-up units.

In order to comply with the regulations of the Environmental Protection Agency, many sulfur plants now in operation of being designed employ some type of tail gas treating process to minimize the amount of sulfur compounds ultimately discharged into the atmosphere. One such treating process is known as the Cold Bed Adsorption (CBA) method which involves taking the sulfur plant tail gas and alternately feeding it to one of at least two catalytic reactors, at least one reactor being operated at about 260° F. to 300° F. on the adsorption cycle (for example, about 18 hours), allowing $H_2S$ and $SO_2$ to further react at this relatively low temperature to produce free sulfur, while at least one other reactor is undergoing a regeneration cycle of, for example, about 12 hours followed by a cooling cycle of, for example, about 6 hours. In regeneration of, for example, the CBA catalyst beds, adsorbed sulfur is driven off the catalyst by the use, for example, of hot (650° F.) effluent from the first reactor in the sulfur plant. The CBA process is described in detail in U.S. Pat. No. 4,035,474. When $NH_3$ is present in the feed stream to the sulfur plant, however, a certain amount of $NH_3$ remains in the sulfur plant tail gas, i.e., the feed to the tail gas clean-up process, for example, the CBA unit. Ammonia present in the feed to the tail gas clean up process can react with $SO_2$ present to form ammonium sulfite which is adsorbed on the catalyst during adsorption cycle. Later in the regeneration cycle when the catalyst is heated with regeneration gas, $NH_3$ is liberated. The liberated $NH_3$ can return in the regeneration gas to pass through the second Claus reactor and thence to the low temperature reactor in adsorption cycle, where it can be again adsorbed on the catalyst. Thus the ammonia can be repetitively adsorbed on the first catalyst bed, then desorbed from the first bed but readsorbed on the second bed, then desorbed from the second but readsorbed on the first in the next cycle, and so forth. Continued operation in this manner can eventually cause the deposition of ammonium salts on the catalyst to be excessive and result in deactivation and plugging of the catalyst.

BRIEF DESCRIPTION OF THE INVENTION

We have now discovered that such deactivation and plugging with ammonium compounds of catalyst on which free sulfur is deposited and which is regenerated by passing a hot regeneration stream in contact therewith can be avoided by subjecting the regeneration effluent gas from the catalyst undergoing regeneration to a procedure which at least reduces the concentration of the ammonia contained therein. Various procedures can be used to treat the regeneration effluent gas. One method is to return a portion of the regeneration effluent gas to a noncatalytic combustion zone or thermal reactor (furnace) of a sulfur plant. Alternatively, a second combustion zone or thermal reactor (furnace) of smaller size may be furnished, to which a portion of the regeneration effluent gas is fed. Yet another alternative is to feed a portion of the regeneration effluent gas to a catalytic reactor for destruction of the ammonia.

In the first method, in which a portion, for example, 5 to 15 percent of the regeneration gas effluent, is recycled to the noncatalytic thermal reactor (furnace) of a sulfur plant, a major portion of the ammonia will be decomposed therein to form nitrogen and water. For example, we have found that with a residence time of 0.9 second and a temperature of about 2570° F. the $NH_3$ content of the regeneration recycle gas can be reduced from 440 ppm to 40 ppm, when 15% of the regeneration effluent gas is recycled to the furnace and one-half of the ammonia in the adsorption reactor feed gas is adsorbed on the catalyst. In order to maintain the proper temperature in the thermal reactor, preheating of the acid gas and air to the burner may be desirable.

Alternatively, a second furnace which is employed to decompose the ammonia may be operated in a manner similar to a thermal incinerator or an inline heater in which fuel gas, such as, for example, methane, is burned using air to supply heat to increase the regeneration gas temperature to, for example, about 2400° F. to 2600° F. The air may be preheated if desired to reduce the amount of fuel gas required. Acid gas (either preheated or not preheated) may be used in place of fuel gas. After combustion, the effluent from the second furnace can be returned to some point in the sulfur plant, for example, upstream from the second Claus reactor. By decomposing a portion of the ammonia in the regeneration effluent gas, the concentration of ammonia in the feed gas to the catalyst bed on the adsorption cycle is reduced, thus preventing an excessive buildup of ammonium deposits.

DESCRIPTION OF THE DRAWINGS

Our invention is further illustrated by reference to the accompanying drawings in which.

DETAILED DESCRIPTION OF THE INVENTION

According to a preferred embodiment of the invention, a gas stream containing ammonia and hydrogen sulfide is combusted in a noncatalytic combustion zone, designated generally as A, to produce a hot effluent stream. The hot effluent stream after cooling to remove free sulfur therefrom is reheated and provided to a Claus type catalytic reaction zone, designated generally as B, comprising one or more catalytic reactors operated at a temperature above the dew point of sulfur. The effluent stream from the Claus catalytic zone is provided to a second catalytic zone for sulfur removal, designated generally as C, comprising one or more catalytic reactors operated at a temperature such that a preponderance of the free sulfur thus formed is deposited on the catalyst, along with ammonium compounds, which can be formed simultaneously.

Preferably, the temperature of the adsorption reactor feedstream is in the range of about 250° F. to about 280° F. although, of course, higher temperatures can be used with less recovery. The adsorption reactor effluent stream, due to temperature rise within the reactor, thus preferably has a temperature in the range of about 270° F. to about 300° F. A preponderance and as high as 90% or better, of the sulfur in the adsorption reactor feedstream is thus removed by adsorption. The catalyst in the second catalytic zone C is periodically regenerated, preferably using a portion of hot effluent from the Claus type catalytic reaction zone, although other hot gas streams can also be used. Free sulfur and ammonium compounds deposited on the catalyst are released during regeneration to produce a regeneration effluent stream containing free sulfur and ammonia. At least a portion of the regeneration effluent stream can be combusted, or catalytically treated, for example, in combustion zone A, or in an ammonia removal zone designated generally as D to convert at least a portion of the ammonia in the gas, preferably substantially all of the ammonia therein, into nitrogen and water to prevent buildup of ammonia in the regeneration gas stream and thereby avoid catalyst deactivation and plugging.

Figure 1:
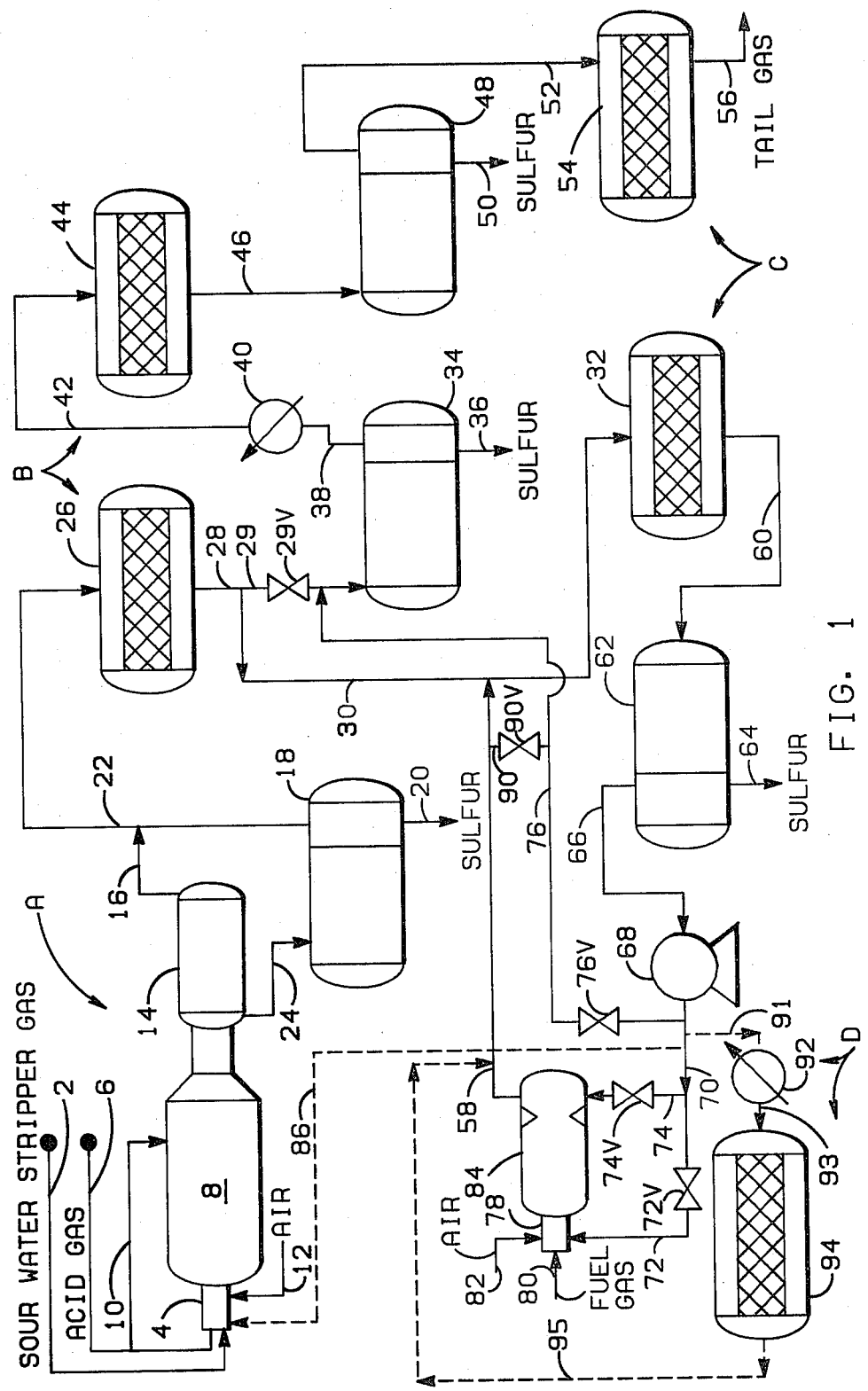
FIG. 1 is a flow diagram illustrating methods and apparatus according to the invention by which the $NH_3$ content of process streams fed to the catalyst beds during regeneration can be minimized.

Referring now to the Figures in detail and in particular to FIG. 1, a gaseous stream containing primarily $NH_3$, $H_2S$ and water vapor can be introduced, for example, at the rate of 18 moles per hour into burner 4 via line 2. The stream in line 2 can contain, for example, approximately 21 volume percent $NH_3$ and 52 volume percent $H_2S$. The 52 volume percent $H_2S$ may represent, for example, about 30% of the total $H_2S$ being charged to the plant. The stream in line 6 (for example, at the rate of 27 moles per hour) contains, for example, 54 volume percent $H_2S$ with the balance being $CO_2$ and $H_2O$. A portion (for example, 13 moles per hour) of the gas in line 6 is diverted to the furnace 8, bypassing burner 4, through line 10. Thus bypassing burner 4 with regard to a portion of the acid gas stream 6 takes advantage of the strong oxidizing conditions in the flame to enhance combustion of $NH_3$ but permits the noncatalytic reaction of $H_2S$ with $SO_2$ in the furnace downstream of the flame zone to produce elemental sulfur. Air is supplied to burner 4 through line 12, for example, at the rate of 65 moles per hour. The flow of air into the burner preferably is such as to correspond to approximately 0.75 mole of oxygen for each mole of ammonia present in furnace 8, and about 0.5 mole of oxygen for each mole of $H_2S$ in the total feed to the plant. Burner 4 discharges acid gas and air into the thermal reactor or furnace 8 with proper mixing. The $NH_3$ is converted principally to nitrogen and water in the combustion zone and approximately one-third of the $H_2S$ is burned to $SO_2$ and water at a temperature preferably in the neighborhood of about 2600° F. This temperature may be higher or lower but we prefer to use the highest temperature that can be tolerated by the commonly used furnace construction materials. These hot products of combustion are then, in the illustrated embodiment, directly transferred to waste heat boiler 14 where a portion thereof is cooled to about 500° F. to 600° F. and conducted therefrom through line 24 into condenser 18 where most of the free sulfur produced in the furnace is converted into liquid form and removed through line 20. The uncondensed gas phase which is at a temperature, for example, of about 325° F. to 375° F. is taken off condenser 18 through line 22. The gas in line 22 is preheated to a temperature of 450° F. to 500° F. by means of hot gas (for example, about 1000° F.) coming from, for example, the first pass of boiler 14 via line 16.

The resulting preheated reactants in stream 22 enter a first Claus catalytic reactor 26 and are withdrawn therefrom at a temperature of, for example, about 600° F.–700° F., preferably 650° F., at the approximate rate, for example, of 108 moles per hour via line 28. This stream is then split with one portion, for example, at the rate of about 54 moles per hour being taken off through line 30 and used for regeneration of reactor 32, for example, a CBA reactor, which will be described later in more detail. The remaining portion, for example, at the rate of about 54 moles per hour via line 29 and valve 29V is introduced into condenser 34 operated, for example, at a gas effluent temperature of about 350° F. and product sulfur is withdrawn through line 36. The gas effluent phase from condenser 34 is taken through line 38 and heated to, for example, about 425° F. in heater 40 before being introduced via line 42 into a second Claus catalytic reactor 44. Reaction products from reactor 44 are removed therefrom via line 46, for example, at about 460° F. and cooled in condenser 48 to about 260° F. Product sulfur is withdrawn through line 50 while the uncondensed phase is taken off through line 52 and fed to low temperature reactor 54, for example, a CBA reactor, which is on adsorption cycle. Elemental sulfur is adsorbed on the catalyst bed in reactor 54 operated, for example, at a temperature between about 270° F. and 300° F., while tail gas from reactor 54 is discharged to a tail gas incinerator through line 56.

Figure 2:
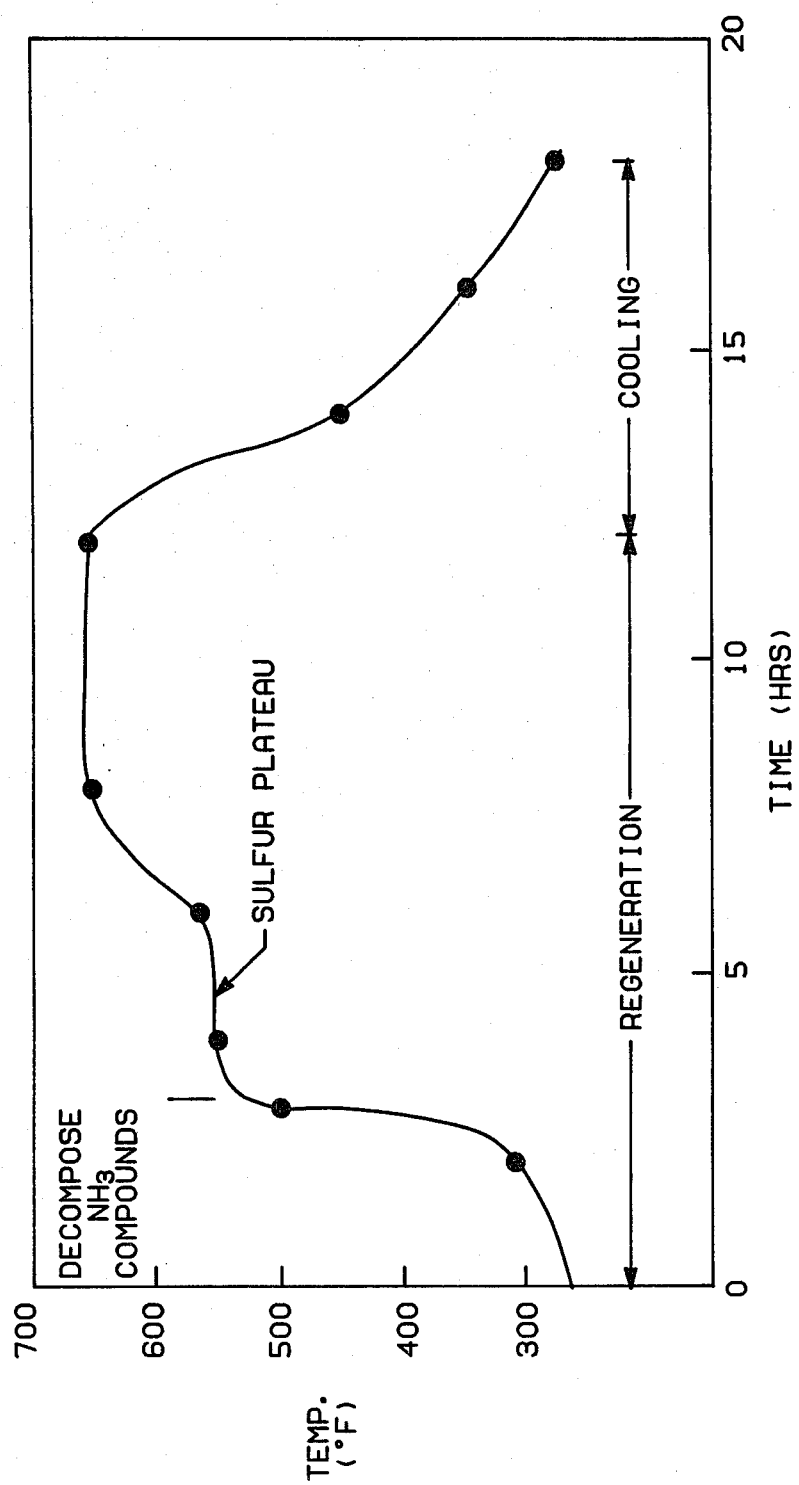
FIG. 2 is a time-temperature curve illustrating what happens during various stages of the process in a catalytic reactor that is being regenerated.

In the regeneration of the catalyst bed in reactor 32, gas at a temperature of, for example, about 650° F. is introduced through lines 30 and 58, for example, at a rate of 108 moles per hour. The origin of the gas in line 58 will be described in detail below. Hot gas used in the regeneration step is withdrawn through line 60 and sent to condenser 62 operated, for example, at an effluent temperature of 350° F. where free sulfur is taken off through line 64. The uncondensed phase is withdrawn through line 66 and sent to blower 68 with the blower outlet stream 70 at 390° F. divided into three streams, 72, 74, and 76, having associated valves 72V, 74V and 76V, respectively, therein to control flow rate. Gas in line 72 is introduced into burner 78, at a rate, for example, of 2.1 moles per hour where it is mixed with fuel gas added via line 80 at the rate, for example, of 0.2 mole per hour and 4.6 moles of air per hour are introduced through line 82. This mixture of gases is burned in ammonia combustion furnace 84, then it is further mixed with, for example, 48 moles per hour of 390° F. gas from line 74. Hot effluent (for example, 650° F.) from furnace 84 is removed through line 58 at the rate of, for example, 54 moles per hour. The ammonia content of this gas is less than 51 ppm. The remaining effluent gas in line 76 at a temperature, for example, of about 390° F. is returned to line 29 at a point downstream of line 30. The mixture of gases in lines 30 and 58 is then used for regeneration of the catalyst in reactor 32. The ammonium compounds on the catalyst are decomposed and $NH_3$ is driven off the catalyst during, for example, the first three hours of the regeneration cycle, as shown in FIG. 2. In the remaining portion of the regeneration cycle, for example, during the next nine hours, free sulfur is removed from the catalyst and the regeneration gas may be derived solely from line 30, or may be derived from line 30 together with gas from line 58 if desired. Thereafter, the cooling portion of the cycle is conducted, for example, for a period of about six hours using procedures which are known to those skilled in the art. After the decomposition of ammonia compounds in reactor 32, flow of regeneration gas through line 58 may be reduced and the flow of air and fuel through burner 78 is continued to hold the temperature of furnace 84 at, for example, about 2000° F. until the next regeneration cycle.

In one embodiment, approximately equal portions of the stream 58 from furnace 84 are combined with about equal portions of hot effluent stream 30 and the resulting mixture used as the regeneration gas stream. Recycling 50% (instead of all) of the regeneration effluent stream can permit some recycle of $NH_3$ and some build-up of ammonium salts on the catalyst. It is expected, however, that the amount of build-up should be insignificant and that plugging should not occur.

A modification of the above flow pattern can be employed by returning the products of combustion from ammonia furnace 84 through line 58 and line 90 with associated valve 90V therein to the inlet line 29 of condenser 34 and thence via line 38, heater 40, and line 42 to the second Claus catalytic reaction vessel 44. Another modification of the above flow diagram which can be employed involves eliminating streams 72, 74, 80, 82, and 58, burner 78, and combustion furnace 84, then returning a major portion of effluent gas from line 70 through line 76 to the inlet line 29 of condenser 34, while taking a portion, for example, 10 to 15 percent thereof, and returning it through a line represented by dashed line 86 to burner 4 and furnace 8 where the $NH_3$ present therein is decomposed to form nitrogen and water. In the modification just mentioned, the proportion of acid gas in stream 6 that is bypassed through line 10 to the second zone of the thermal reactor 8 is increased in proportion to the flow rate in stream 86, to maintain temperature in the first zone of the thermal reactor 8 as required for proper combustion of the ammonia.

According to the invention, ammonia in the regeneration effluent stream can be reduced by passing at least a portion of the regeneration effluent stream through a catalyst bed to decompose the ammonia. The catalyst can be any suitable catalyst effective for decomposition of the ammonia. Such catalysts can include, for example, catalysts as described in Canadian Pat. No. 1,004,030 (1977) comprising at least one sulfided metal of Group VA, Group VIA, the third period of Group VIII and the Rare Earth Series supported on an alumina, silica, or silica alumina support at a temperature of at least about 1000° F. Preferably, the catalyst employed contains one or more sulfides of the metals iron, nickel, cobalt, molybdenum, vanadium, and thorium deposited or co-precipitated on the support. This embodiment of the invention is represented in FIG. 1 by dashed line 91, inline heater 92, line 93, catalytic reactor 94, and line 95. Dashed line 91 feeds at least a portion of the regeneration effluent stream to inline heater 92 to raise the temperature to a temperature preferably in the range of about 1200° F. to about 1500° F. The output of heater 92 is fed through line 93 to catalytic reactor 94 where ammonia is decomposed in the presence of a catalyst as described above. The output of reactor 94 is provided through line 95 to line 58 and can be treated further as described above.

Certain sulfur plant feed gas streams contain diluents such as, for example, carbon dioxide which make it difficult to obtain a high enough thermal reaction temperature to thermally decompose ammonia and/or hydrogen cyanide which can be present. Such gas streams occur, for example, in the coke oven gas process. In this situation, an alternative flow path using a catalytic process as described above can be employed to decompose the ammonia and/or hydrogen cyanide which may be present in the effluent from a sulfur plant furnace such as, for example, thermal reactor 8 in FIG. 1.

From the foregoing description, it will be apparent that we have provided a practical process for handling ammonia-containing $H_2S$ streams in sulfur recovery plant tail gas treating systems by minimizing the ammonia content of the feed gas to the tail gas treating system. In addition, by employing an ammonia combustion furnace 84, it is possible to maintain high regeneration capacity at extreme turndown, i.e., where the ratio of design feed rate to available feed rate is high.

Although the invention has been described in detailed embodiments as required and illustrated by exemplary flow rates and compositions, it is of course intended not to limit the invention thereby, but by the claims appended hereto.

Our invention now having been described, what we claim is:

1. A process for sulfur recovery comprising:
   subjecting a gas stream containing ammonia and hydrogen sulfide to a partial combustion step in a noncatalytic first combustion zone to produce a mixture including hydrogen sulfide, sulfur dioxide, nitrogen, water, and unconverted ammonia;
   introducing the thus-produced water mixture into a Claus first catalytic reaction zone in which hydrogen sulfide and sulfur dioxide in the mixture react at a temperature above the dew point of sulfur to produce a hot effluent stream containing free sulfur;
   separating the thus-produced free sulfur from the hot effluent stream to produce a tail gas stream;
   forming free sulfur by contacting the tail gas stream with a catalyst at a temperature such that the preponderance of free sulfur thus formed is deposited on the catalyst;
   simultaneously depositing ammonium compounds on the catalyst;
   removing the thus-deposited free sulfur and ammonium compounds from the catalyst by passing a hot regeneration gas in contact with the catalyst to produce a regeneration effluent stream comprising free sulfur and ammonia; and
   reducing the concentration of ammonia in at least a portion of the regeneration effluent stream to produce a stream leaner in ammonia, said portion of the regeneration effluent stream being combusted in a noncatalytic combustion zone to produce said stream leaner in ammonia.

2. A process for sulfur recovery comprising:
   subjecting a gas stream containing ammonia and hydrogen sulfide to a partial combustion step in a noncatalytic first combustion zone to produce a mixture including hydrogen sulfide, sulfur dioxide, nitrogen, water, and unconverted ammonia;
   introducing the thus-produced mixture into a Claus first catalytic reaction zone in which hydrogen sulfide and sulfur dioxide in the mixture react at a temperature above the dew point of sulfur to produce a hot effluent stream containing free sulfur;
   separating the thus-produced free sulfur from the hot effluent stream to produce a tail gas stream;
   forming free sulfur by contacting the tail gas stream with a catalyst at a temperature such that the preponderance of free sulfur thus formed is deposited on the catalyst;
   simultaneously depositing ammonium compounds on the catalyst;
   removing the thus-deposited free sulfur and ammonium compounds from the catalyst by passing a hot regeneration gas in contact with the catalyst to produce a regeneration effluent stream comprising free sulfur and ammonia; and
   reducing the concentration of ammonia in at least a portion of the regeneration effluent stream to produce a stream leaner in ammonia, said portion of the regeneration effluent stream being subjected to catalytic conditions effective for decomposition of ammonia to reduce the concentration of ammonia in said portion of the regeneration effluent stream to produce said stream leaner in ammonia.

3. A process as in either of claims 1 or 2 further comprising:
   returning at least a portion of the stream leaner in ammonia as the hot regeneration gas.

4. A process as in either of claims 1 or 2 wherein: the stream leaner in ammonia is mixed with the feed to at least one Claus reactor in a Claus catalytic reaction zone in which hydrogen sulfide and sulfur dioxide react at a temperature above the dew point of sulfur to produce free sulfur.

5. A process as in either of claims 1 or 2 wherein:
the stream leaner in ammonia is employed in the hot regeneration gas only so long as ammonia is being liberated from the catalyst during regeneration of the catalyst, said hot effluent stream from said Claus first catalytic reaction zone otherwise serving as the sole regeneration gas.

6. The process of claim 1 wherein:
5 to 15 percent of the regeneration effluent stream is returned to the noncatalytic first combustion zone where the ammonia in said regeneration effluent stream is substantially decomposed into nitrogen and water and the thus-combusted stream is subsequently fed to the Claus first catalytic reaction zone.

7. The process of claim 1 wherein:
said regeneration effluent stream is combusted in said noncatalytic combustion zone to reduce the concentration of ammonia therein only until such time as the ammonium compounds on said catalyst have been substantially driven off; and
the temperature of said noncatalytic reaction zone is held at about 2000° F. until a subsequent regeneration cycle.

8. The process of claim 1 wherein:
a first portion of said regeneration effluent stream is subjected to combustion in a second combustion zone; and
the thus-produced stream leaner in ammonia is mixed with a remaining portion of said regeneration effluent stream to produce said regeneration gas.

9. The process of claim 2 wherein:
about equal portions of the thus-produced stream leaner in ammonia are combined with about equal portions of hot effluent from said Claus first catalytic reaction zone and the resulting mixture is employed as the regeneration gas.

10. A process for sulfur recovery from a gas stream containing ammonia and hydrogen sulfide comprising:
forming free sulfur by contacting the gas stream with a catalyst at a temperature such that the preponderance of free sulfur thus formed is deposited on the catalyst;
simultaneously depositing ammonium compounds on the catalyst;
removing the thus-deposited free sulfur and ammonium compounds from the catalyst by passing a hot regeneration gas in contact with the catalyst to produce a regeneration effluent stream comprising free sulfur and ammonia; and
reducing the concentration of ammonia in at least a portion of the regeneration effluent stream to produce a stream leaner in ammonia wherein said portion of the regeneration effluent stream is subjected to catalytic conditions effective for decomposition of ammonia to reduce the concentration of ammonia in said portion of the regeneration effluent stream to produce said stream leaner in ammonia.

11. A process as in claim 10 further comprising:
returning at least a portion of the stream leaner in ammonia as the hot regeneration gas.

12. A process for sulfur recovery from a gas stream containing ammonia and hydrogen sulfide comprising:
forming free sulfur by contacting the gas stream with a catalyst at a temperature such that the preponderance of free sulfur thus formed is deposited on the catalyst;
simultaneously depositing ammonium compounds on the catalyst;
removing the thus-deposited free sulfur and ammonium compounds from the catalyst by passing a hot regeneration gas in contact with the catalyst to produce a regeneration effluent stream comprising free sulfur and ammonia; and
reducing the concentration of ammonia in at least a portion of the regeneration effluent stream to produce a stream leaner in ammonia wherein the stream leaner in ammonia is mixed with the feed to at least one Claus reactor in a Claus catalytic reaction zone in which hydrogen sulfide and sulfur dioxide react at a temperature above the dew point of sulfur to produce free sulfur.

13. Apparatus for sulfur recovery from a stream comprising hydrogen sulfide and ammonia comprising:
catalytic means for catalytically forming free sulfur from the gas stream under conditions effective for depositing a preponderance of the free sulfur thus formed on catalyst in said means and simultaneously depositing ammonium compounds on the catalyst;
regeneration means for removing thus deposited free sulfur and ammonium compounds from the catalyst by passing a hot regeneration gas in contact with the catalyst to produce a regeneration effluent stream comprising free sulfur and ammonia at an outlet of the catalytic means; and
ammonia concentration reducing means in flow communication with the outlet of the catalytic means for reducing the concentration of ammonia in at least a portion of the regeneration effluent stream and producing a stream leaner in ammonia, said ammonia concentration reducing means being means for catalytically decomposing ammonia in said portion of the regeneration effluent stream and producing the stream leaner in ammonia.

14. Apparatus as in claim 13 further comprising:
means for returning at least a portion of the stream leaner in ammonia as at least a portion of the hot regeneration gas.

* * * * *